US012790172B2

(12) United States Patent
Iwama et al.

(10) Patent No.: US 12,790,172 B2
(45) Date of Patent: Nov. 10, 2026

(54) 3D DATA ACQUISITION DEVICE, 3D DATA ACQUISITION SYSTEM, AND 3D DATA ACQUISITION METHOD FOR ELEVATOR

(71) Applicant: Mitsubishi Electric Corporation, Tokyo (JP)

(72) Inventors: Haruyuki Iwama, Tokyo (JP); Wataru Fuse, Tokyo (JP); Keisuke Sambongi, Tokyo (JP); Yu Enomoto, Tokyo (JP); Yasuo Watanabe, Tokyo (JP); Hironori Inayoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1057 days.

(21) Appl. No.: 17/920,063

(22) PCT Filed: Apr. 27, 2020

(86) PCT No.: PCT/JP2020/017982

§ 371 (c)(1),
(2) Date: Oct. 20, 2022

(87) PCT Pub. No.: WO2021/220344

PCT Pub. Date: Nov. 4, 2021

(65) Prior Publication Data

US 2023/0159301 A1 May 25, 2023

(51) Int. Cl.
*B66B 5/00* (2006.01)
*H04N 23/51* (2023.01)
(Continued)

(52) U.S. Cl.
CPC ........... *B66B 5/0018* (2013.01); *H04N 23/54* (2023.01); *H04N 23/90* (2023.01); *H04N 23/51* (2023.01); *H04N 23/56* (2023.01)

(58) Field of Classification Search
CPC ..... B66B 5/0018; B66B 7/02; B66B 11/0005; B66B 19/007; B66B 5/0087; H04N 23/54; H04N 23/90; H04N 23/51; H04N 23/56
See application file for complete search history.

(56) References Cited

U.S. PATENT DOCUMENTS

| | | | | |
|---|---|---|---|---|
| 11,702,316 | B2 * | 7/2023 | Witczak | G01C 21/20 187/391 |
| 2009/0120734 | A1 * | 5/2009 | Barneman | B66B 19/002 187/408 |

(Continued)

FOREIGN PATENT DOCUMENTS

| | | |
|---|---|---|
| CN | 107561085 A | 1/2018 |
| CN | 109151273 A | 1/2019 |

(Continued)

OTHER PUBLICATIONS

Office Action issued Jul. 14, 2025 in German Patent Application No. 11 2020 007 118.9, 13 pages.

(Continued)

*Primary Examiner* — Bickey Dhakal
(74) *Attorney, Agent, or Firm* — XSENSUS LLP

(57) ABSTRACT

To provide a 3D data acquisition device, a 3D data acquisition system, and a 3D data acquisition method for an elevator which are capable of improving measurement accuracy of 3D point group data on an inside of a shaft. The 3D data acquisition device for the elevator includes: a housing that constitutes an outer shell; and a plurality of 3D distance imaging sensors which are provided in the housing so as to directly face each of a plurality of side walls of a shaft of the elevator on a horizontal projection plane and which acquire 3D point group data. According to the configuration, measurement accuracy of 3D point group data on the inside of the shaft can be improved.

7 Claims, 17 Drawing Sheets

(51) Int. Cl.
*H04N 23/54* (2023.01)
*H04N 23/56* (2023.01)
*H04N 23/90* (2023.01)

(56) References Cited

U.S. PATENT DOCUMENTS

| | | | |
|---|---|---|---|
| 2016/0084649 A1 | 3/2016 | Yamazaki et al. | |
| 2016/0139269 A1 | 5/2016 | Yamazaki et al. | |
| 2017/0297681 A1 | 10/2017 | Yamada et al. | |
| 2017/0363949 A1 | 12/2017 | Valente et al. | |
| 2018/0155155 A1 | 6/2018 | Kawanishi et al. | |
| 2019/0002240 A1* | 1/2019 | Xiong | B66B 9/00 |
| 2019/0177120 A1 | 6/2019 | Studer et al. | |
| 2020/0095105 A1* | 3/2020 | Yutzy | B66F 17/006 |
| 2020/0128120 A1 | 4/2020 | Trojan | |

FOREIGN PATENT DOCUMENTS

| | | | |
|---|---|---|---|
| DE | 20 2017 003 503 | U1 | 9/2017 |
| JP | 64-54208 | A | 3/1989 |
| JP | 5-332737 | A | 12/1993 |
| JP | 2004-012152 | A | 1/2004 |
| JP | 2004-37203 | A | 2/2004 |
| JP | 2005-096919 | A | 4/2005 |
| JP | 2016-60610 | A | 4/2016 |
| JP | 2016-78987 | A | 5/2016 |
| JP | 2016-98063 | A | 5/2016 |
| JP | 2017-001818 | A | 1/2017 |
| JP | 2017-67657 | A | 4/2017 |
| JP | 2017-193327 | A | 10/2017 |
| JP | 2017-198581 | A | 11/2017 |
| JP | 2018-173392 | A | 11/2018 |
| JP | 2020-040781 | A | 3/2020 |
| WO | 2016/199850 | A1 | 12/2016 |

OTHER PUBLICATIONS

International Search Report mailed on Jul. 21, 2020, received for PCT Application PCT/JP2020/017982, filed on Apr. 27, 2020, 5 pages including English Translation.

Office Action issued Mar. 21, 2025 in Chinese Patent Application No. 202080100022.9, 20 pages.

Hearing Notice issued Mar. 22, 2024 in Indian Patent Application No. 202247060068, 3 pages.

Office Action issued Aug. 29, 2025 in Chinese Patent Application No. 202080100022.9, 26 pages.

Indian Office Action issued Dec. 28, 2022 in corresponding Indian Patent Application No. 202247060068 (with English translation), 6 pages.

* cited by examiner

3D DATA ACQUISITION DEVICE, 3D DATA ACQUISITION SYSTEM, AND 3D DATA ACQUISITION METHOD FOR ELEVATOR

CROSS-REFERENCE TO RELATED APPLICATION

The present application is based on PCT filing PCT/JP2020/017982, filed Apr. 27, 2020, the entire contents of which are incorporated herein by reference.

FIELD

The present disclosure relates to a 3D data acquisition device, a 3D data acquisition system, and a 3D data acquisition method for an elevator.

BACKGROUND

PTL 1 discloses a 3D data acquisition device for an elevator. According to the 3D data acquisition device, 3D point group data on an inside of a shaft can be measured.

CITATION LIST

Patent Literature

[PTL 1] WO 2016/199850 A1

SUMMARY

Technical Problem

However, in the 3D data acquisition device described in PTL 1, a measurement direction does not necessarily directly face a wall of the shaft on a horizontal projection plane. Therefore, measurement accuracy of the 3D point group data may decline.

The present disclosure has been made to solve the problem described above. An object of the present disclosure is to provide a 3D data acquisition device, a 3D data acquisition system, and a 3D data acquisition method for an elevator which are capable of improving measurement accuracy of 3D point group data on the inside of a shaft.

Solution to Problem

A 3D data acquisition device for an elevator according to the present disclosure includes: a housing that constitutes an outer shell; and a plurality of 3D distance imaging sensors which are provided in the housing so as to directly face each of a plurality of side walls of a shaft of an elevator on a horizontal projection plane and which acquire 3D point group data.

A 3D data acquisition system for an elevator according to the present disclosure includes: the 3D data acquisition device; and a supporting body provided so as to be capable of supporting the 3D data acquisition device in an upward facing state and a laterally facing state, the upward facing state being a state where a measurement direction of the plurality of 3D distance imaging sensors directly faces each of a plurality of side walls of a shaft of an elevator on a horizontal projection plane, and the laterally facing state being a state where a measurement direction of one of the plurality of 3D distance imaging sensors directly faces a floor surface of the shaft on a vertical projection plane.

A 3D data acquisition method for an elevator according to the present disclosure includes: a first installation step of installing the housing of the 3D data acquisition system in the upward facing state on a ceiling of the car; and a raising or lowering step of raising or lowering the car after the first installation step when the terminal announces information prompting raising or lowering the car.

Advantageous Effects

According to the present disclosure, a plurality of 3D distance imaging sensors are provided in a housing so as to directly face each of a plurality of side walls of a shaft of an elevator on a horizontal projection plane and to have an upward angle with respect to a horizontal plane such that a direction of a center of the housing becomes a measurement direction. Therefore, measurement accuracy of 3D point group data on the inside of the shaft can be improved.

DESCRIPTION OF EMBODIMENTS

Embodiments will be described in accordance with the accompanying drawings. In the respective drawings, same or equivalent portions will be denoted by same reference signs. Redundant descriptions of such portions will be abbreviated or omitted as deemed appropriate.

First Embodiment

Figure 1A:
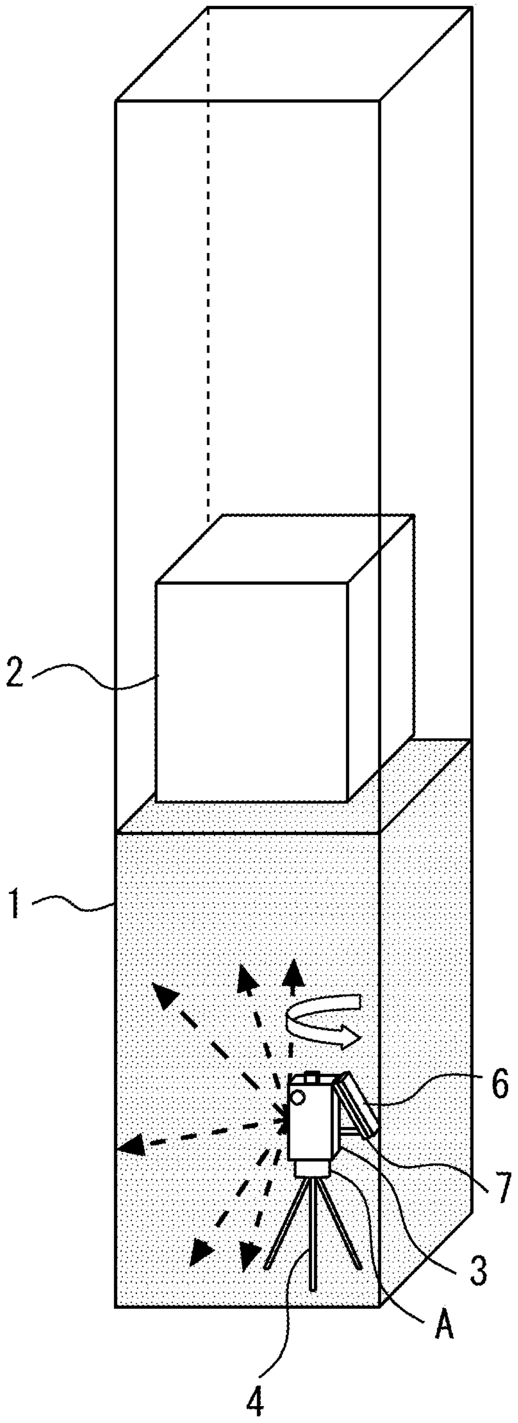
FIG. 1A and FIG. 1B are diagrams for explaining an outline of acquisition of 3D data of a shaft by a 3D data acquisition system for an elevator according to a first embodiment.
Figure 1B:
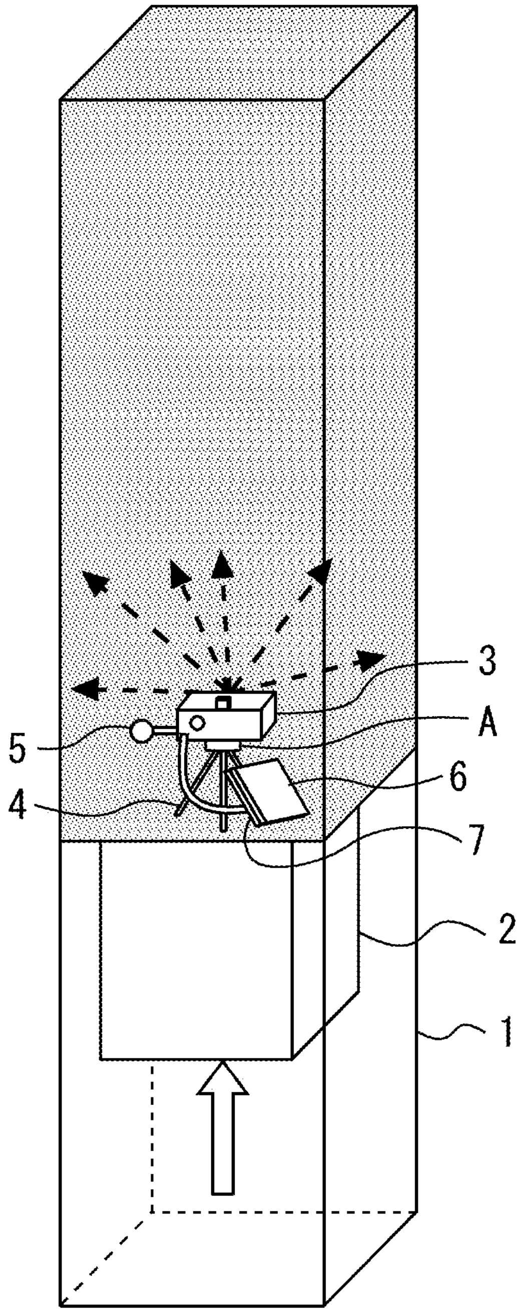

FIG. 1A and FIG. 1B are diagrams for explaining an outline of acquisition of 3D data of a shaft by a 3D data acquisition system for an elevator according to a first embodiment.

In an elevator system shown in FIG. 1A and FIG. 1B, a shaft 1 penetrates each floor of a building (not illustrated). A car 2 is provided so as to be capable of ascending and descending inside the shaft 1.

The 3D data acquisition system includes a 3D data acquisition device 3, a supporting body 4, a rotating body A, a magnet 5, a holding body 6, and a terminal 7.

The 3D data acquisition device 3 is a device for acquiring 3D point group data. For example, the supporting body 4 is a tripod. The rotating body A is provided in an upper part of the supporting body 4. With a rotation axis as a vertical direction, the rotating body A rotatably supports the 3D data acquisition device 3 from below. The magnet 5 is provided on the supporting body 4. The magnet 5 generates a magnetic force. The holding body 6 is mounted to the 3D data acquisition device 3 or the supporting body 4. For example, the terminal 7 is a tablet terminal. The terminal 7 is attachably and detachably held by the holding body 6.

As shown on FIG. 1A, upon measurement in a bottom portion of the shaft 1, a first worker installs the 3D data acquisition system near a center of the bottom portion of the shaft 1. In doing so, the holding body 6 is mounted to a rear surface of the 3D data acquisition device 3. The 3D data acquisition device 3 is supported by the rotating body A in a laterally facing state. In this state, the first worker causes software of the terminal 7 to start measurement of 3D point group data by the 3D data acquisition device 3. Subsequently, the 3D data acquisition device 3 automatically rotates by 360 degrees. Subsequently, the 3D data acquisition device 3 automatically ends the measurement of the 3D point group data.

As shown on FIG. 1B, upon measurement on a ceiling of the car 2, the first worker installs the 3D data acquisition system near a center of the ceiling of the car 2. In doing so, the holding body 6 is mounted to the supporting body 4. The magnet 5 is attracted to a structure of the ceiling of the car 2. The 3D data acquisition device 3 is supported by the rotating body A in an upward facing state. In this state, using the software of the terminal 7, the first worker instructs the 3D data acquisition device 3 to start measurement of 3D point group data. Subsequently, the first worker leaves from the ceiling of the car 2. Subsequently, the terminal 7 announces a start of the measurement of 3D point group data by voice and sound. Subsequently, from inside the car 2, a second worker raises or lowers the car 2 by a hand operation. Subsequently, the terminal 7 announces an end of the measurement of 3D point group data by voice and sound.

Next, the 3D data acquisition device 3 will be described with reference to FIGS. 2 and 3.

Figure 2:
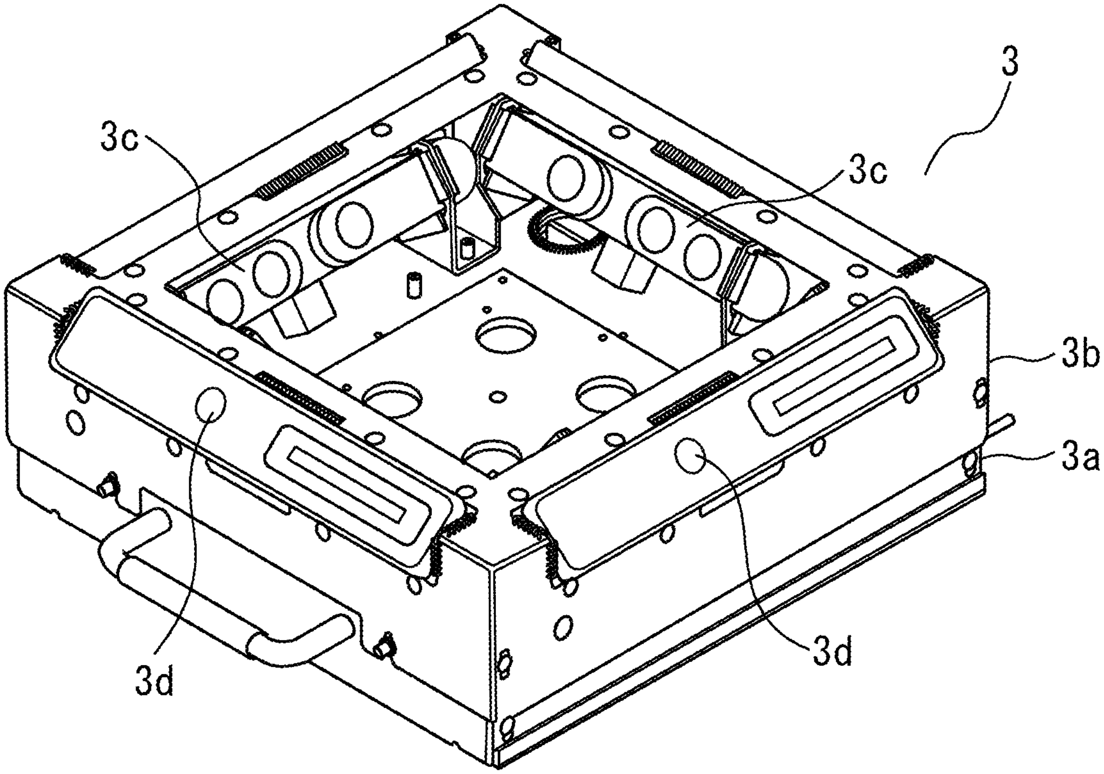
FIG. 2 is a perspective view of the 3D data acquisition device of the 3D data acquisition system for an elevator according to the first embodiment.

FIG. 2 is a perspective view of the 3D data acquisition device of the 3D data acquisition system for an elevator according to the first embodiment. FIG. 3 is a side view of the 3D data acquisition device of the 3D data acquisition system for an elevator according to the first embodiment.

Figure 3:
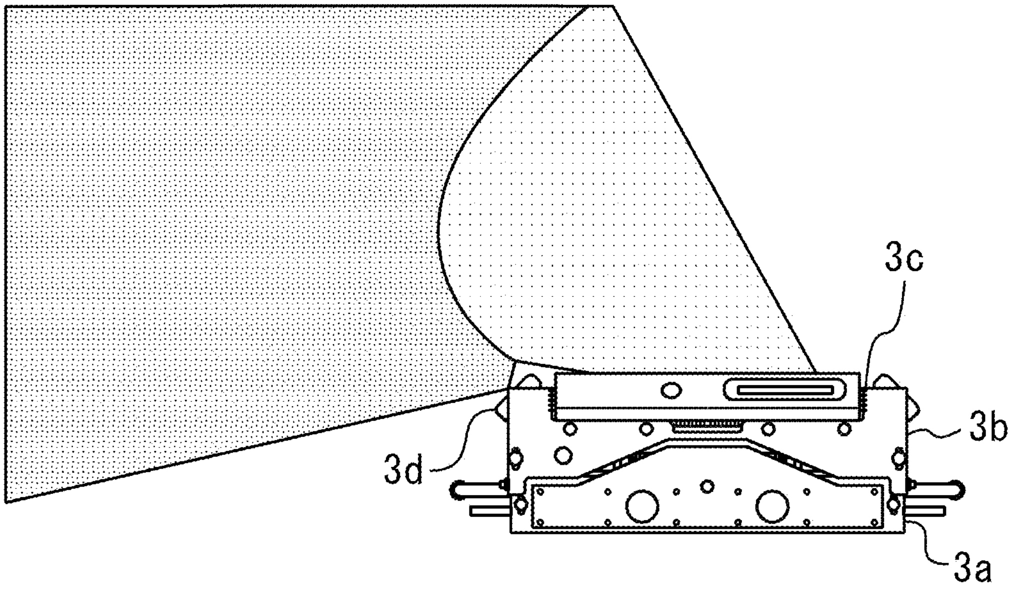
FIG. 3 is a side view of the 3D data acquisition device of the 3D data acquisition system for an elevator according to the first embodiment.

As shown in FIGS. 2 and 3, the 3D data acquisition device 3 includes a first housing 3*a*, a second housing 3*b*, a plurality of 3D distance imaging sensors 3*c*, and a plurality of light-emitting devices 3*d*.

The first housing 3*a* constitutes a part of an outer shell. For example, the first housing 3*a* is formed in a rectangular shape. The second housing 3*b* is formed separately from the first housing 3*a*. The second housing 3*b* constitutes a part of the outer shell. The second housing 3*b* is provided on a front side of a first housing 3*a* so as to cover a plurality of edges of the first housing 3*a*.

For example, each of the plurality of 3D distance imaging sensors 3*c* is a 3D camera. Each of the plurality of 3D distance imaging sensors 3*c* is provided at a center of each of the plurality of edges of the first housing 3*a*. A measurement direction of the plurality of 3D distance imaging sensors 3*c* is set so as to directly face each of a plurality of side walls of the shaft 1 on a horizontal projection plane and to have an elevation angle with respect to a horizontal plane in an upward facing state. The measurement direction of the plurality of 3D distance imaging sensors 3*c* is set so as to coincide with a direction of a center of the first housing 3*a*. A measurement direction of any one of the plurality of 3D distance imaging sensors is set so as to directly face a floor surface of the shaft 1 on a vertical projection plane and to have an angle with respect to a vertical plane in a laterally facing state. The plurality of 3D distance imaging sensors 3*c* acquire 3D point group data in accordance with a structure on the inside of the shaft 1.

For example, each of the plurality of light-emitting devices 3*d* is an LED. Each of the plurality of light-emitting devices 3*d* is provided on each of a plurality of sides of the second housing 3*b* at a position that is outside of a measurement range of the 3D distance imaging sensor 3*c* provided on an opposite side to a side on which the light-emitting device 3*d* itself is provided. Each of the plurality of light-emitting devices 3*d* emits light toward the measurement range of the 3D distance imaging sensor 3*c* provided on the opposite side to the side on which the light-emitting device 3*d* itself is provided.

Next, a method of mounting the 3D data acquisition device 3 in a laterally facing state will be described with reference to FIG. 4.

Figure 4:
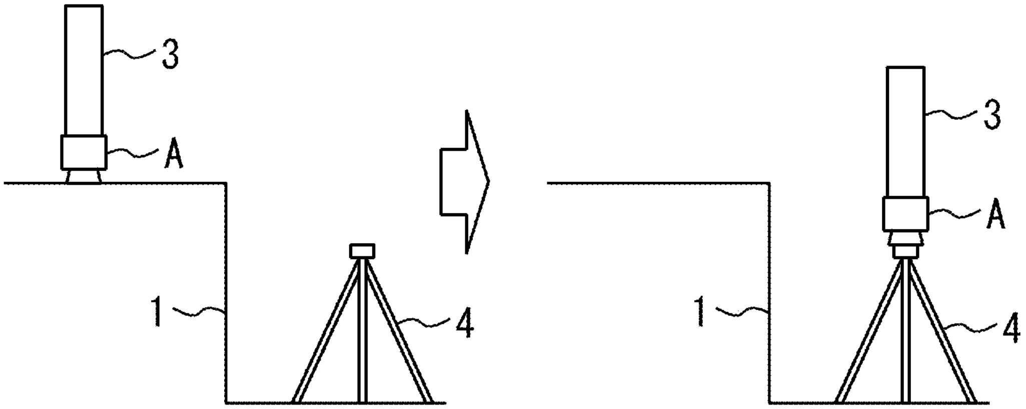
FIG. 4 is a diagram for explaining a method of mounting, in a laterally facing state, the 3D data acquisition device of the 3D data acquisition system for an elevator according to the first embodiment.

FIG. 4 is a diagram for explaining a method of mounting, in a laterally facing state, the 3D data acquisition device of the 3D data acquisition system for an elevator according to the first embodiment.

In FIG. 4, the 3D data acquisition device 3 is fixed to the rotating body A by a screw (not illustrated) in a laterally facing state. Specifically, the 3D data acquisition device 3 is fixed to the rotating body A by rotating the rotating body A in one direction. In this state, the rotating body A is fitted into an upper part of the supporting body 4. As a result, the 3D data acquisition device 3 is maintained in the laterally facing state.

Next, a method of mounting the 3D data acquisition device 3 in an upward facing state will be described with reference to FIG. 5.

Figure 5:
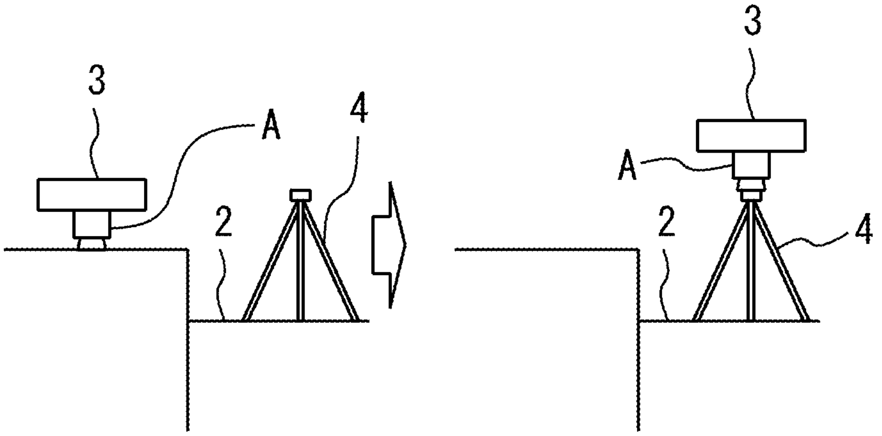
FIG. 5 is a diagram for explaining a method of mounting, in an upward facing state, the 3D data acquisition device of the 3D data acquisition system for an elevator according to the first embodiment.

FIG. 5 is a diagram for explaining a method of mounting, in an upward facing state, the 3D data acquisition device of the 3D data acquisition system for an elevator according to the first embodiment.

In FIG. 5, the 3D data acquisition device 3 is fixed to the rotating body A by a screw (not illustrated) in an upward facing state. Specifically, the 3D data acquisition device 3 is fixed to the rotating body A by rotating the rotating body A in one direction. In this state, the rotating body A is fitted into an upper part of the supporting body 4. As a result, the 3D data acquisition device 3 is maintained in the upward facing state.

Next, a method of switching the 3D data acquisition device 3 from the laterally facing state to the upward facing state will be described with reference to FIG. 6.

Figure 6:
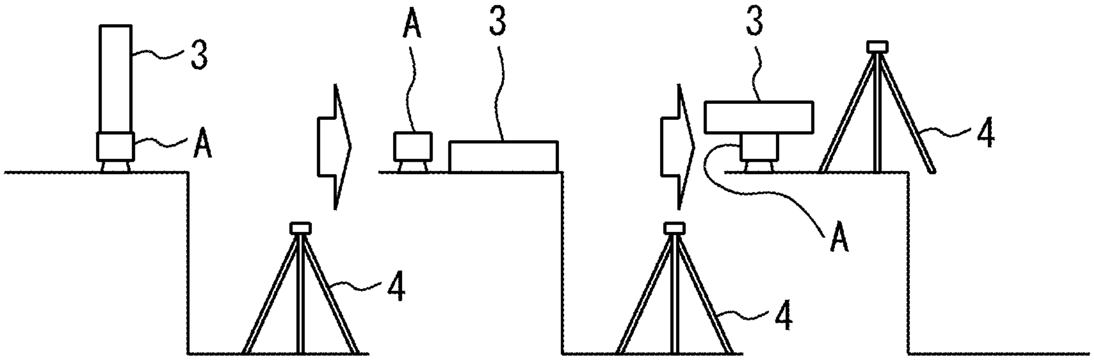
FIG. 6 is a diagram for explaining a method of switching the 3D data acquisition device of the 3D data acquisition system for an elevator according to the first embodiment from the laterally facing state to the upward facing state.

FIG. 6 is a diagram for explaining a method of switching the 3D data acquisition device of the 3D data acquisition system for an elevator according to the first embodiment from the laterally facing state to the upward facing state.

In FIG. 6, the rotating body A is detached from the upper part of the supporting body 4 in a state where the 3D data acquisition device 3 in the laterally facing state is being fixed. Subsequently, the 3D data acquisition device 3 is released from a fixed state of the rotating body A by loosening the screw (not illustrated) in the laterally facing state. Specifically, the 3D data acquisition device 3 is released from the fixed state of the rotating body A by rotating the rotating body A in another direction. Subsequently, the 3D data acquisition device 3 is fixed to the rotating body A by the screw (not illustrated) in the upward facing state.

Next, a result of a measurement of the bottom portion of the shaft 1 by the laterally-facing 3D data acquisition device 3 will be schematically described with reference to FIGS. 7 and 8.

Figure 7:
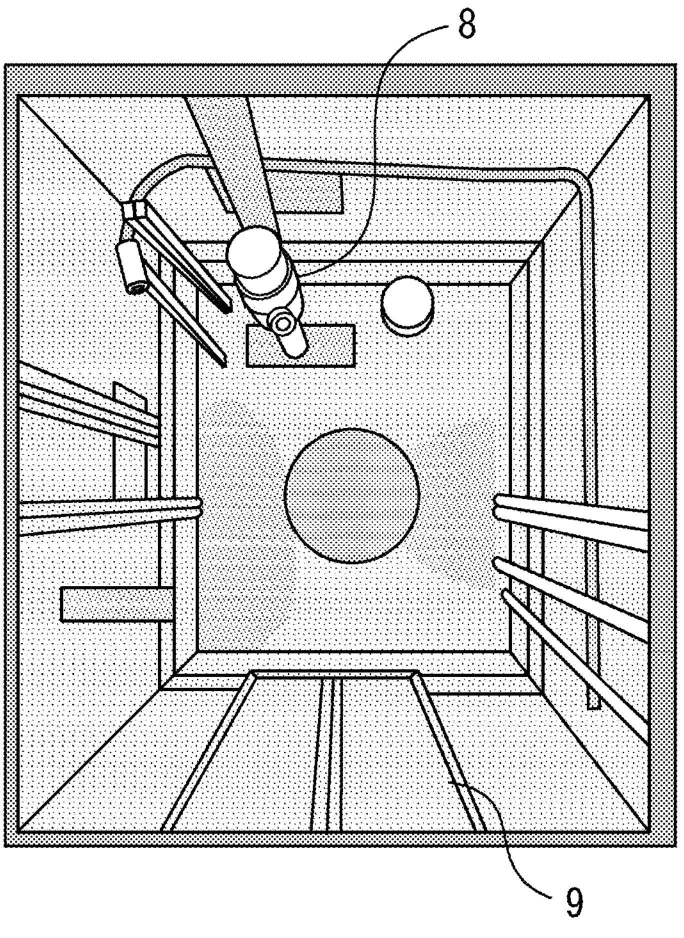
FIG. 7 is a diagram showing a measurement result of the floor surface of the shaft by the 3D data acquisition system for an elevator according to the first embodiment.

FIG. 7 is a diagram showing a measurement result of the floor surface of the shaft by the 3D data acquisition system for an elevator according to the first embodiment. FIG. 8 is a diagram showing a measurement result of the bottom portion of the shaft by the 3D data acquisition system for an elevator according to the first embodiment.

Figure 8:
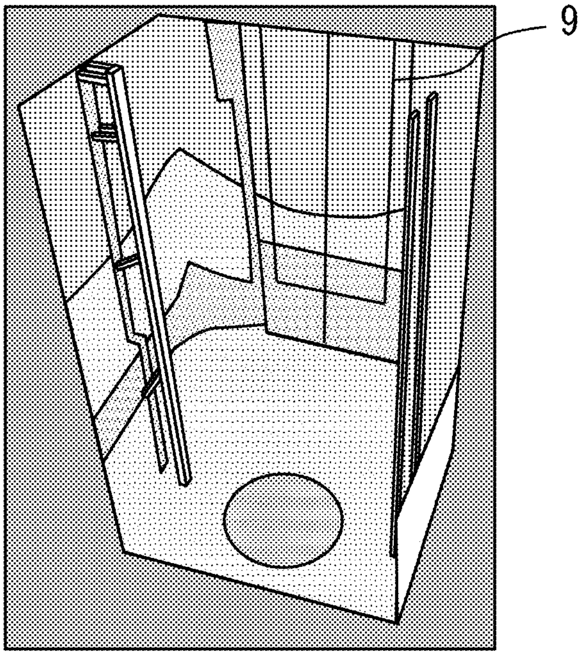
FIG. 8 is a diagram showing a measurement result of the bottom portion of the shaft by the 3D data acquisition system for an elevator according to the first embodiment.

As shown in FIGS. 7 and 8, structures in the bottom portion of the shaft 1 are accurately measured. For example, a hydraulic plunger 8, a hatch door 9 of a bottom floor, and the like are accurately measured.

Next, a result of a measurement of the shaft 1 by the upward-facing 3D data acquisition device 3 will be schematically described with reference to FIG. 9.

Figure 9:
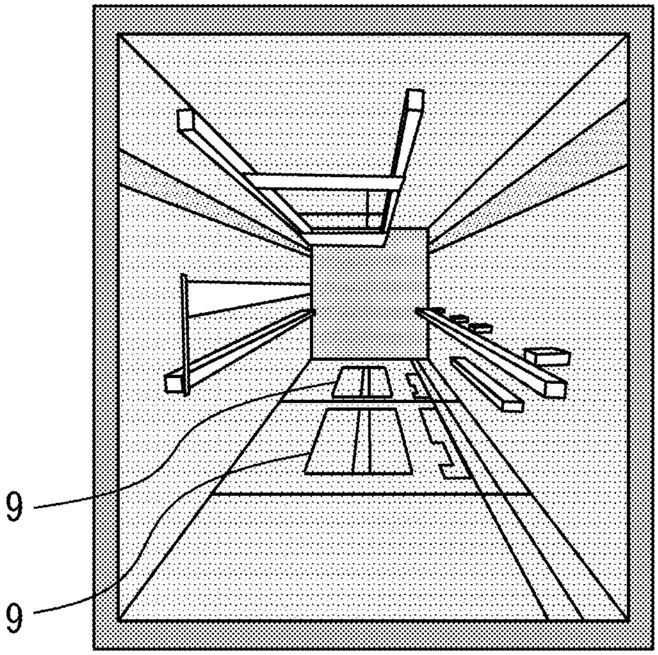
FIG. 9 is a diagram showing a measurement result of the shaft by the 3D data acquisition system for an elevator according to the first embodiment.

FIG. 9 is a diagram showing a measurement result of the shaft by the 3D data acquisition system for an elevator according to the first embodiment.

As shown in FIG. 9, structures other than the bottom portion of the shaft 1 are accurately measured. For example, the hatch door 9 of an intermediate floor and the like are accurately measured.

Next, the terminal 7 will be described with reference to FIGS. 10 and 11.

Figure 10:
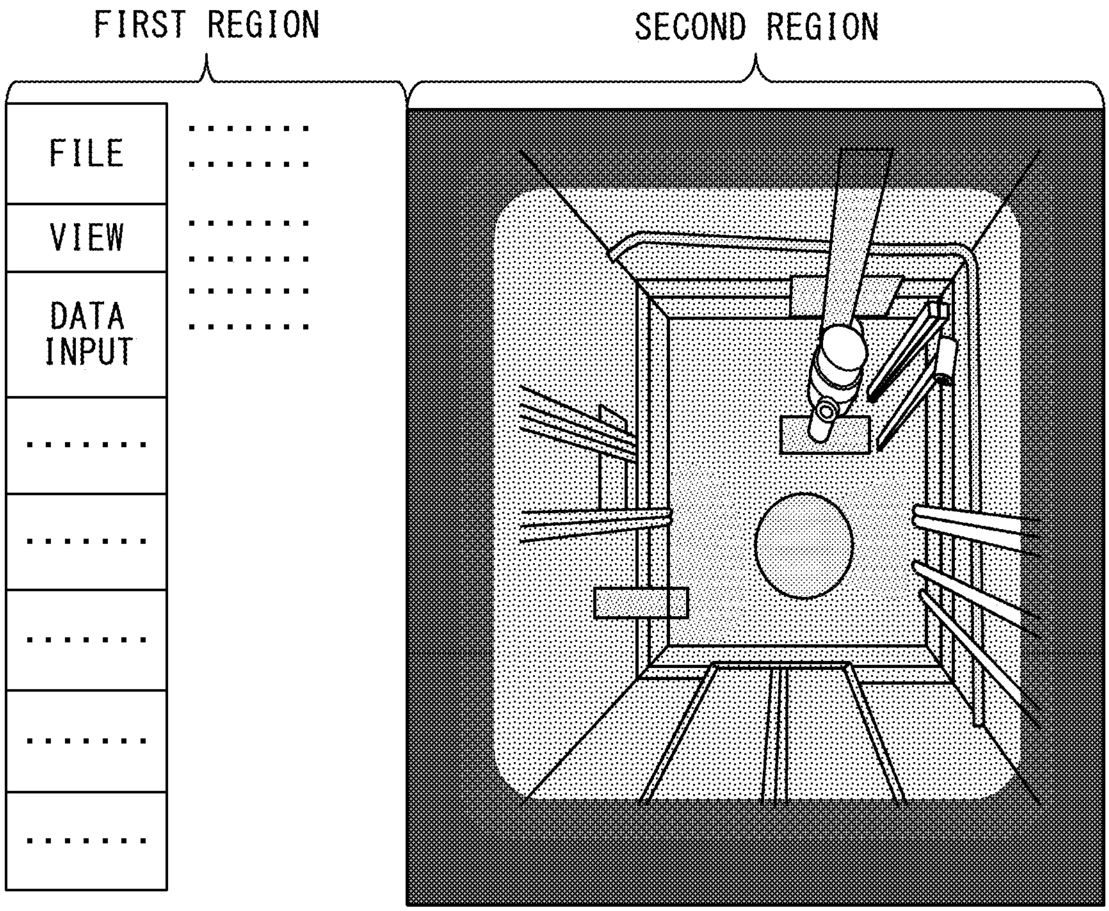
FIG. 10 is a diagram showing an application screen of a terminal of the 3D data acquisition system for an elevator according to the first embodiment.

FIG. 10 is a diagram showing an application screen of a terminal of the 3D data acquisition system for an elevator according to the first embodiment. FIG. 11 is a diagram showing a detection result of a portion of the shaft by the terminal of the 3D data acquisition system for an elevator according to the first embodiment.

In the terminal 7, dimension calculation software analyzes 3D point group data on the inside of the shaft 1 by interacting with a worker. The dimension calculation software applies a GUI for calculating a desired dimension to the inside of the shaft 1. In addition to a function dedicated to dimension calculation, the dimension calculation software is equipped with a function as a viewer of 3D point group data.

As shown in FIG. 10, the application screen includes a first region and a second region. The first region is a region on a left side of the application screen. In the first region, a plurality of tab menus are displayed arranged in in a vertical direction. The second region is a region on a right side of the application screen. In the second region, 3D point group data acquired by the 3D distance imaging sensors 3*c* is displayed.

The dimension calculation software calculates an average of a distance between a point group corresponding to a portion such as a side wall or a floor surface of the shaft 1 and a reference plane. Specifically, with respect to a dimension in a lateral direction of the shaft 1, the dimension calculation software uses three planes based on a position of a car-side guide rail as reference planes. With respect to a dimension in a longitudinal direction, the dimension calculation software uses a plane with a same height as a floor surface of a hall as a reference plane.

The dimension calculation software combines image processing techniques with respect to 3D point group data such as a model fitting technique, 2D pattern matching, and line extraction to automatically extract a reference plane. For example, the dimension calculation software establishes a reference for a dimension calculation of the shaft 1 by automatically extracting a car-side guide rail or a landing sill to be a reference for an on-site examination of the elevator.

Figure 11:
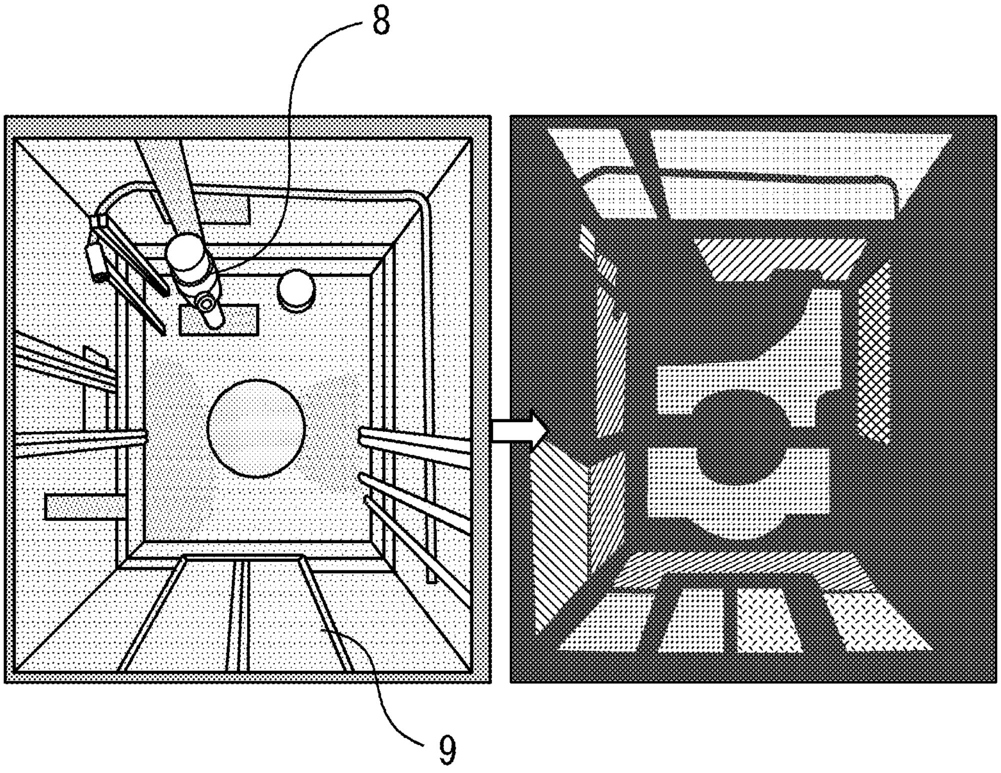
FIG. 11 is a diagram showing a detection result of a portion of the shaft by the terminal of the 3D data acquisition system for an elevator according to the first embodiment.

As shown in FIG. 11, based on results of extracting a plane, performing structural analysis processing such as clustering, and the like on 3D point group data, the dimension calculation software automatically extracts 3D point group data corresponding to a portion of the shaft 1 such as a side wall or a floor surface of the shaft 1. Extraction results are displayed by changing colors so as to be distinguishable.

Based on a result obtained by the functions of the dimension calculation software, a worker operates the GUI and executes a dimension calculation that combines reference planes with respective side walls, the floor surface, and the like of the shaft 1.

The worker outputs acquired dimensions to the outside in a format according to a type of the shaft 1, a structure of a building, and the like via the terminal 7. For example, the worker registers a dimension calculation result in a database together with various pieces of accompanying information or stores the dimension calculation result as a document via the terminal 7.

The terminal 7 includes software or an application that performs measurement control of the 3D distance imaging sensors and software or an application that performs a dimension calculation based on measured 3D point group data. The software or the application for measurement control includes a 3D point group generation function based on SLAM (Simultaneously Localization and Mapping) or a 3D restructuring technique. As the 3D restructuring technique, for example, a technique described in literature "Taguchi, Y., et al.: Point-Plane SLAM for Hand-Held 3D Sensors, IEEE International Conference on Robotics and Automation (ICRA), 5182-5189 (2013)" is used.

According to the first embodiment described above, the plurality of 3D distance imaging sensors 3*c* directly face each of the plurality of side walls of the shaft 1 on a horizontal projection plane. Therefore, measurement accuracy of 3D point group data on the inside of the shaft 1 can be improved.

In addition, the plurality of 3D distance imaging sensors 3*c* have an elevation angle with respect to a horizontal plane. Therefore, a range of imaging of wall surfaces of the shaft 1 can be expanded by increasing distances to the wall surfaces of the shaft 1.

In addition, the plurality of 3D distance imaging sensors 3*c* are provided on the first housing 3*a* so that a direction of the center of the first housing 3*a* becomes a measurement direction. Therefore, a range of imaging of wall surfaces of the shaft 1 can be expanded by increasing distances to the wall surfaces of the shaft 1.

In addition, each of the plurality of light-emitting devices 3*d* is provided at a position that is outside of a measurement range of a corresponding 3D distance imaging sensor 3*c*. Each of the plurality of light-emitting devices 3*d* emits light toward the measurement range of the corresponding 3D distance imaging sensor 3*c*. Each of the plurality of light-emitting devices 3*d* emits light so that obstacles do not enter an irradiation range. Therefore, 3D point group data can be acquired in a stable manner.

In addition, the supporting body 4 is provided so as to be capable of supporting the 3D data acquisition device 3 in both the upward facing state and the laterally facing state of the 3D data acquisition device 3. The 3D data acquisition device 3 is maintained in the laterally facing state during measurement in the bottom portion of the shaft 1. The 3D data acquisition device 3 is maintained so as to face upward during measurement on the ceiling of the car 2. Therefore, 3D point group data can be readily and accurately acquired in the bottom portion of the shaft 1 and on the ceiling of the car 2.

With a rotation axis as a vertical direction, the supporting body 4 rotatably supports the 3D data acquisition device 3. Therefore, 3D point group data can be readily acquired in the bottom portion of the shaft 1.

In addition, the magnet 5 is attracted to a structure of the ceiling of the car 2. Therefore, the 3D data acquisition system can be prevented from falling on the ceiling of the car 2.

Furthermore, the terminal 7 receives 3D point group data from the 3D data acquisition device 3. Accordingly, overall 3D point group data of the shaft 1 can be quickly acquired.

In addition, the holding body 6 changes a holding position of the terminal 7 between when the 3D data acquisition device 3 is in the upward facing state and in the laterally facing state. Therefore, 3D point group data can be readily and accurately acquired in the bottom portion of the shaft 1 and on the ceiling of the car 2.

Furthermore, in the terminal 7, information prompting raising or lowering the car 2 may be announced in accordance with a start of acquisition of 3D point group data by the 3D data acquisition device 3. In this case, the car 2 can be raised or lowered at an appropriate timing.

The terminal 7 can perform wireless communication with the 3D data acquisition device 3. In this case, 3D point group data of the shaft 1 can be safely acquired by operating the terminal 7 from inside the car 2 after installing the 3D data acquisition device 3 on the ceiling of the car 2.

In the present embodiment, a general-purpose 3D camera is adopted. Therefore, a cost of devices can be suppressed. In doing so, the 3D camera is specialized and optimized for the measurement of the shaft 1 so as to satisfy specification requirements such as measurement accuracy.

In addition, the dedicated software is an UI that can be operated intuitively. Due to the system described above, determinations required to be made on site regarding the measurement of the shaft 1 and whether or not a renewal can be supported can be made without special experience.

Measured 3D point group data is expected to be utilized in all elevator-related processes including order entry, design, production, installation, and maintenance.

According to the present embodiment, utilization in a wide variety of fields is expected including customer proposal, preparing plans for work with a constructor, design and arrangements that do not require gauging, determination of 3D fitting in cooperation with BIM, and the like.

Next, a modification of a measurement method by the 3D data acquisition system will be described with reference to FIGS. 12 to 15.

FIGS. 12 to 15 are diagrams for explaining a modification of a measurement method by the 3D data acquisition system for an elevator according to the first embodiment.

Figure 12:
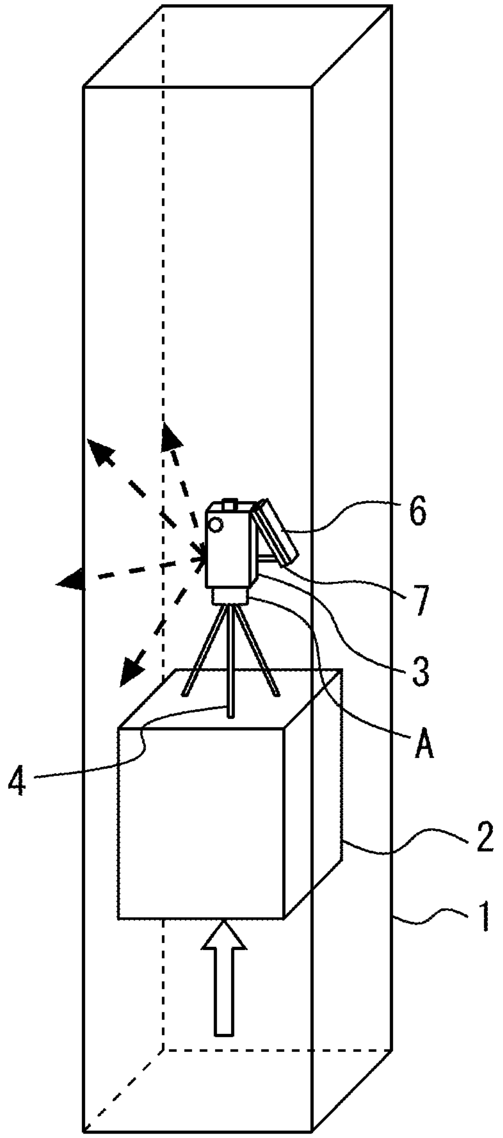
FIG. 12 is a diagram for explaining a modification of a measurement method by the 3D data acquisition system for an elevator according to the first embodiment.

In FIG. 12, the 3D data acquisition device 3 is arranged on the ceiling of the car 2 in a laterally facing state. In this state, the 3D distance imaging sensors 3*c* perform measurement while the car 2 is being raised and lowered. In this case, the 3D distance imaging sensor 3*c* on an upper side measures an upper surface of a structure of the shaft 1. The 3D distance imaging sensor 3*c* on a lower side measures a lower surface of the structure of the shaft 1.

Figure 13:
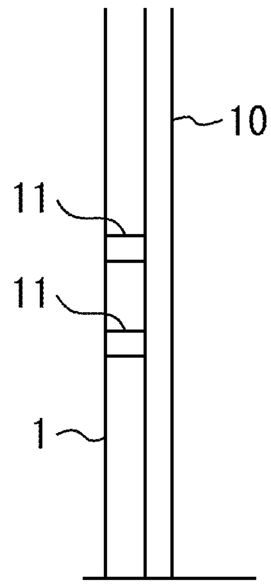
FIG. 13 is a diagram for explaining a modification of a measurement method by the 3D data acquisition system for an elevator according to the first embodiment.
Figure 14:
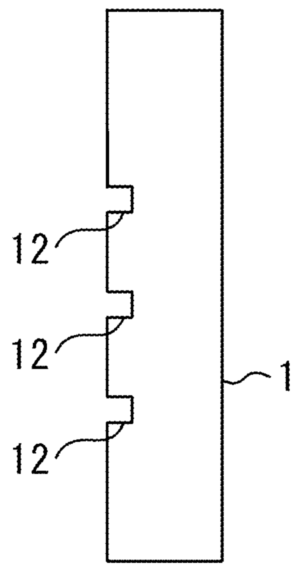
FIG. 14 is a diagram for explaining a modification of a measurement method by the 3D data acquisition system for an elevator according to the first embodiment.
Figure 15:
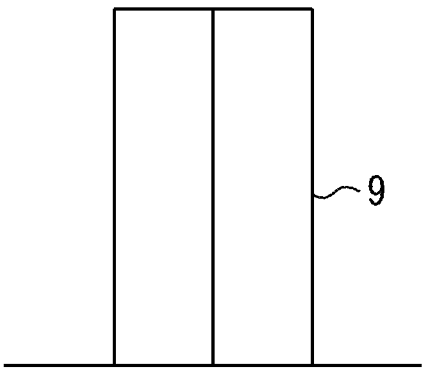
FIG. 15 is a diagram for explaining a modification of a measurement method by the 3D data acquisition system for an elevator according to the first embodiment.

For example, as shown in FIG. 13, the 3D data acquisition device 3 measures an upper surface and a lower surface of each of a plurality of brackets 11 that support a car-side guide rail 10. For example, as shown in FIG. 14, the 3D data acquisition device 3 measures an upper surface and a lower surface of each of a plurality of landing sills 12. For example, as shown in FIG. 15, the 3D data acquisition device 3 measures an entirety of the hatch door 9.

According to the modification, intervals of adjacent brackets 11 can be accurately measured. Measuring edges of adjacent landing sills 12 enables a floor height to be accurately measured. Measuring a tilt of the hatch door 9 enables a determination to be made regarding whether or not a smoke shielding function can be added to the hatch door 9.

Next, an example of the terminal 7 will be described with reference to FIG. 16.

Figure 16:
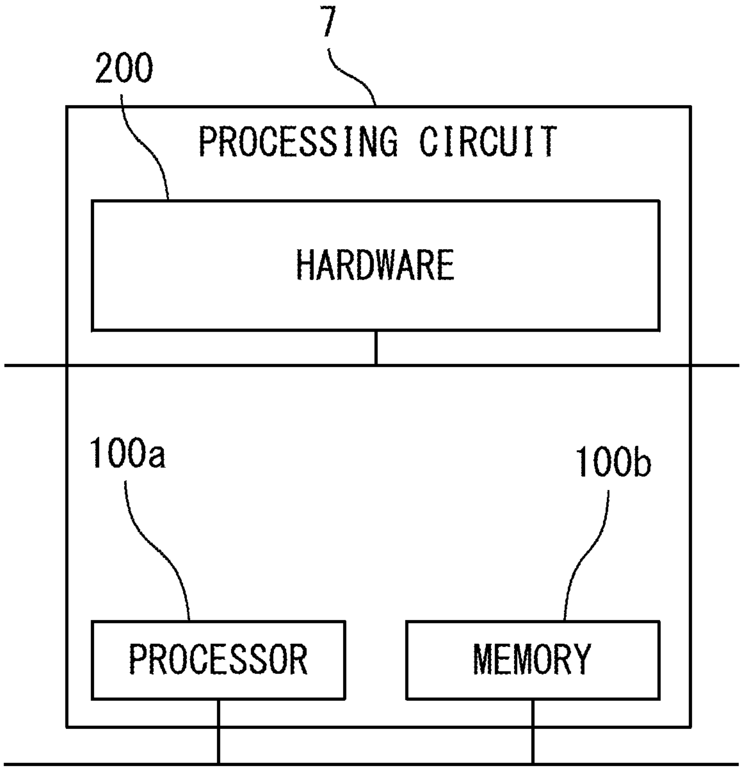
FIG. 16 is a hardware block diagram of a terminal of the 3D data acquisition system for an elevator according to the first embodiment.

FIG. 16 is a hardware block diagram of a terminal of the 3D data acquisition system for an elevator according to the first embodiment.

Each function of the terminal 7 can be realized by a processing circuit. For example, the processing circuit includes at least one processor 100*a* and at least one memory

100*b*. For example, the processing circuit includes at least one piece of dedicated hardware 200.

When the processing circuit includes the at least one processor 100*a* and the at least one memory 100*b*, each function of the terminal 7 is realized by software, firmware, or a combination of software and firmware. At least one of the software and the firmware is described as a program. At least one of the software and the firmware is stored in the at least one memory 100*b*. The at least one processor 100*a* realizes each function of the terminal 7 by reading and executing the program stored in the at least one memory 100*b*. The at least one processor 100*a* is also referred to as a central processing unit, a processing unit, an arithmetic unit, a microprocessor, a microcomputer, or a DSP. For example, the at least one memory 100*b* is a non-volatile or a volatile semiconductor memory such as a RAM, a ROM, a flash memory, an EPROM, or an EEPROM, a magnetic disk, a flexible disk, an optical disk, a compact disc, a mini disc, a DVD, or the like.

When the processing circuit includes the at least one piece of dedicated hardware 200, for example, the processing circuit is realized by a single circuit, a combined circuit, a programmed processor, a parallel-programmed processor, an ASIC, an FPGA, or a combination thereof. For example, each function of the terminal 7 is independently realized by a processing circuit. For example, the respective functions of the terminal 7 are collectively realized by a processing circuit.

With respect to each function of the terminal 7, a part of the function may be realized by the piece of dedicated hardware 200 and another part may be realized by software or firmware. For example, a function for controlling the 3D data acquisition device 3 may be realized by a processing circuit as the piece of dedicated hardware 200 and functions other than the function for controlling the 3D data acquisition device 3 may be realized by having the at least one processor 100*a* read and execute a program stored in the at least one memory 100*b*.

In this manner, the processing circuit realizes each function of the terminal 7 using the hardware 200, software, firmware, or a combination thereof.

Next, a first modification of the 3D data acquisition system will be described with reference to FIGS. 17 to 20.

Figure 17:
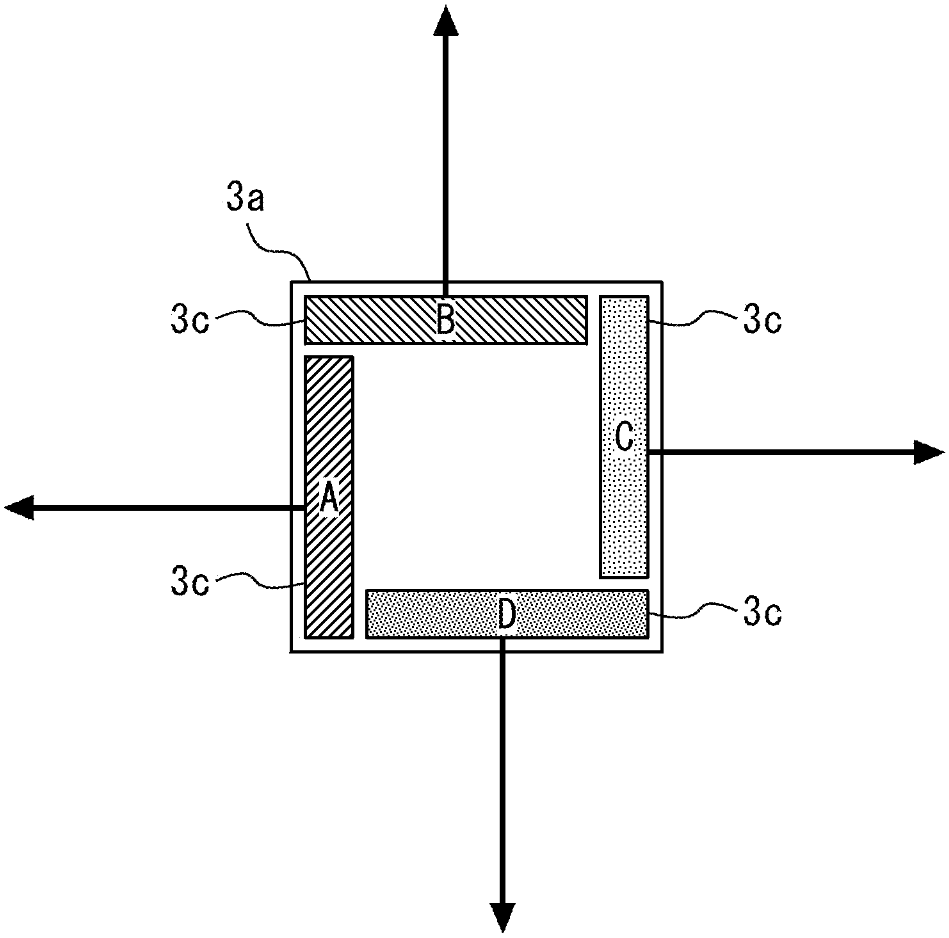
FIG. 17 is a plan view of a 3D data acquisition device used in the first modification of the 3D data acquisition system for an elevator according to the first embodiment.
Figure 18:
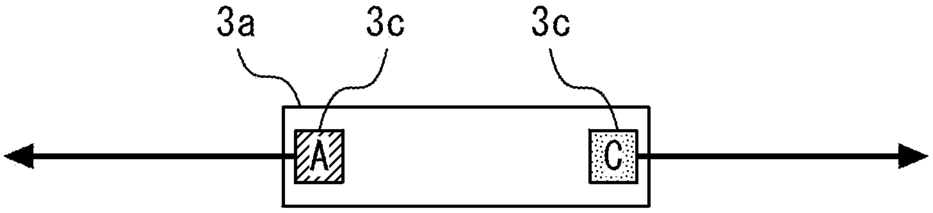
FIG. 18 is a side view of the 3D data acquisition device used in the first modification of the 3D data acquisition system for an elevator according to the first embodiment.
Figure 19:
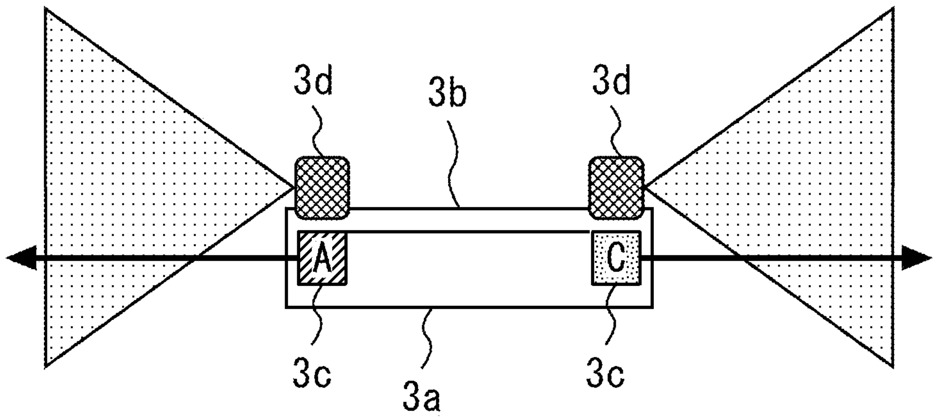
FIG. 19 is a side view of the 3D data acquisition device used in the first modification of the 3D data acquisition system for an elevator according to the first embodiment.
Figure 20:
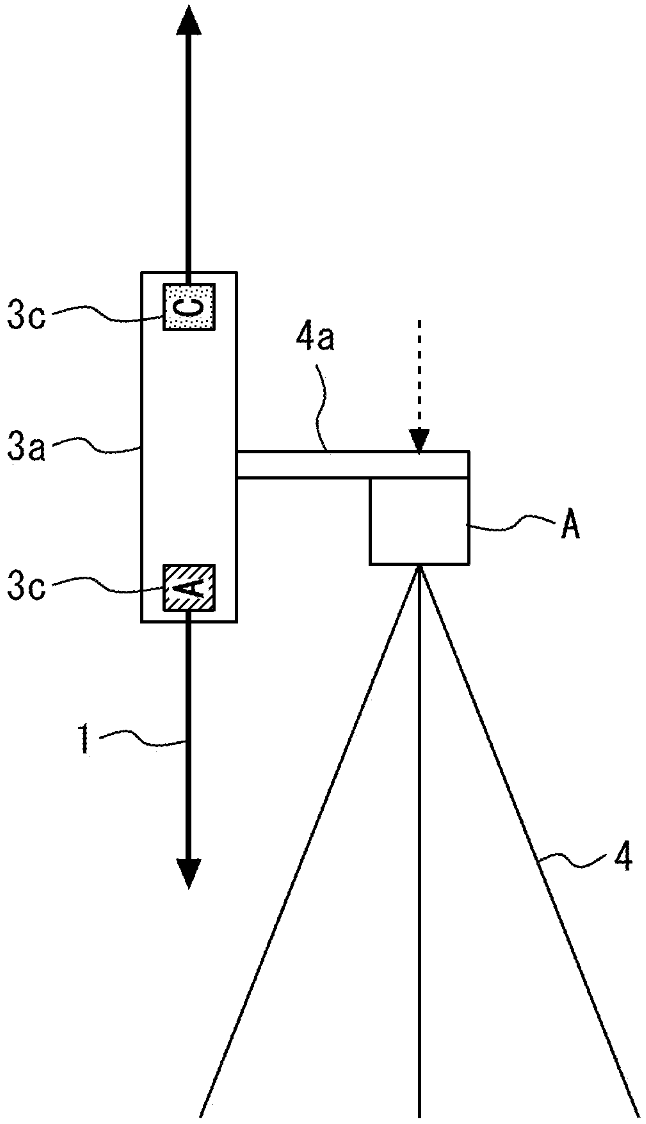
FIG. 20 is a side view of the first modification of the 3D data acquisition system for an elevator according to the first embodiment.

FIG. 17 is a plan view of a 3D data acquisition device used in the first modification of the 3D data acquisition system for an elevator according to the first embodiment. FIGS. 18 and 19 are side views of the 3D data acquisition device used in the first modification of the 3D data acquisition system for an elevator according to the first embodiment. FIG. 20 is a side view of the first modification of the 3D data acquisition system for an elevator according to the first embodiment.

As shown in FIGS. 17 and 18, in the 3D data acquisition device 3, the plurality of 3D distance imaging sensors 3*c* are provided in the first housing 3*a* without an elevation angle with respect to a horizontal plane. The plurality of 3D distance imaging sensors 3*c* are provided on the first housing 3*a* so that an opposite direction to the direction of the center of the first housing 3*a* becomes a measurement direction.

As shown in FIG. 19, each of the plurality of light-emitting devices 3*d* is provided on each of a plurality of edges of the second housing 3*b* at a position that is outside of a measurement range of each of the 3D distance imaging sensors 3*c*. The plurality of light-emitting devices 3*d* emit light toward the measurement range of each of the plurality of 3D distance imaging sensors 3*c*. The plurality of light-emitting devices 3*d* emit light so that obstacles do not enter an irradiation range.

As shown in FIG. 20, a supporting section 4*a* of the supporting body 4 is provided so as to protrude in a horizontal direction from an upper surface of the rotating body A. The supporting section 4*a* supports the 3D data acquisition device 3 in a laterally facing state in a state where the supporting section 4*a* is mounted to an opposite side to the plurality of 3D distance imaging sensors 3*c* in the first housing 3*a*.

Next, a second modification of the 3D data acquisition system will be described with reference to FIGS. 21 to 24.

Figure 21:
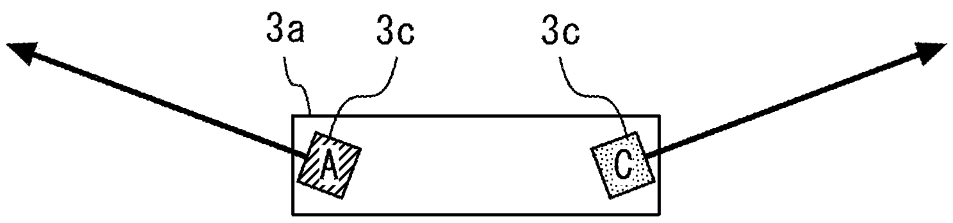
FIG. 21 is a side view of a 3D data acquisition device used in the second modification of the 3D data acquisition system for an elevator according to the first embodiment.
Figure 22:
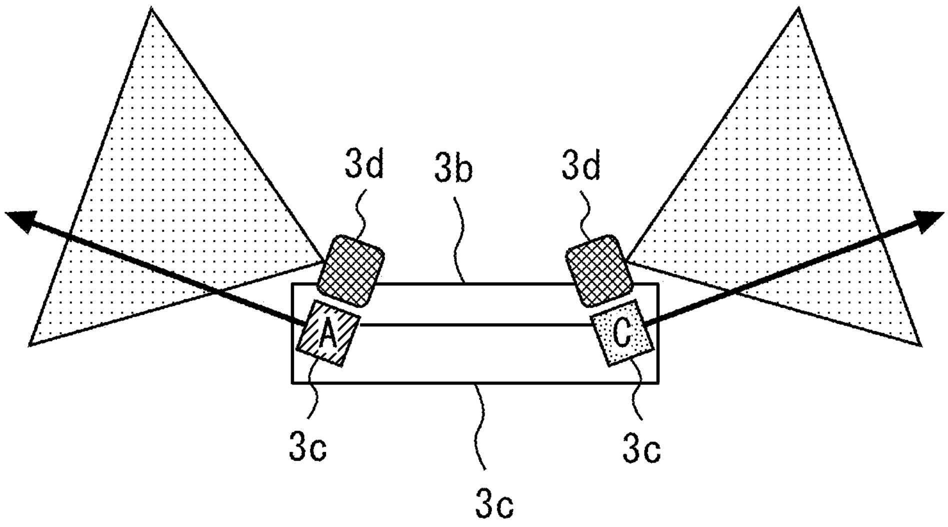
FIG. 22 is a side view of a 3D data acquisition device used in the second modification of the 3D data acquisition system for an elevator according to the first embodiment.
Figure 23:
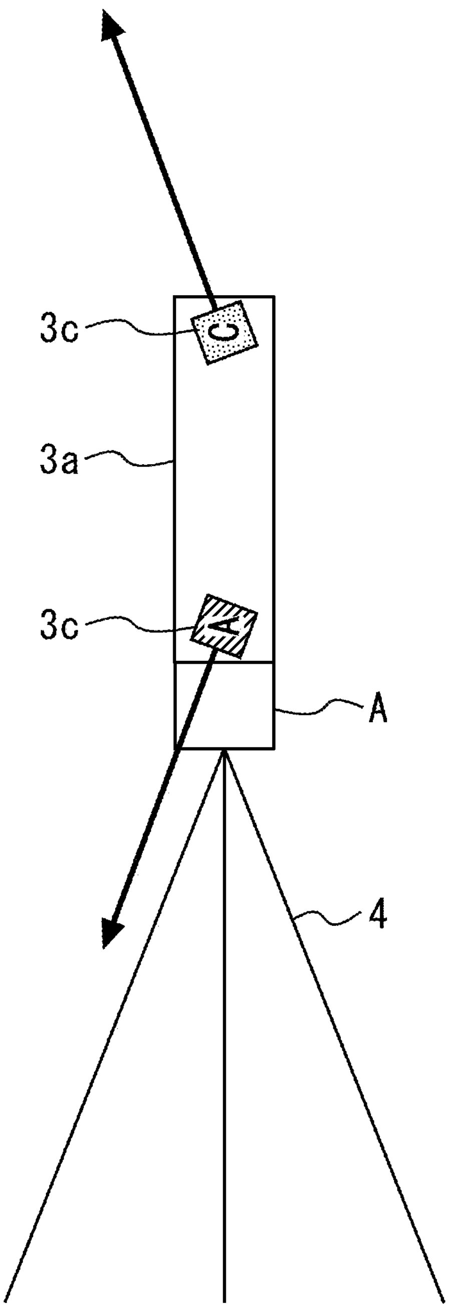
FIG. 23 is a side view of the second modification of the 3D data acquisition system for an elevator according to the first embodiment.
Figure 24:
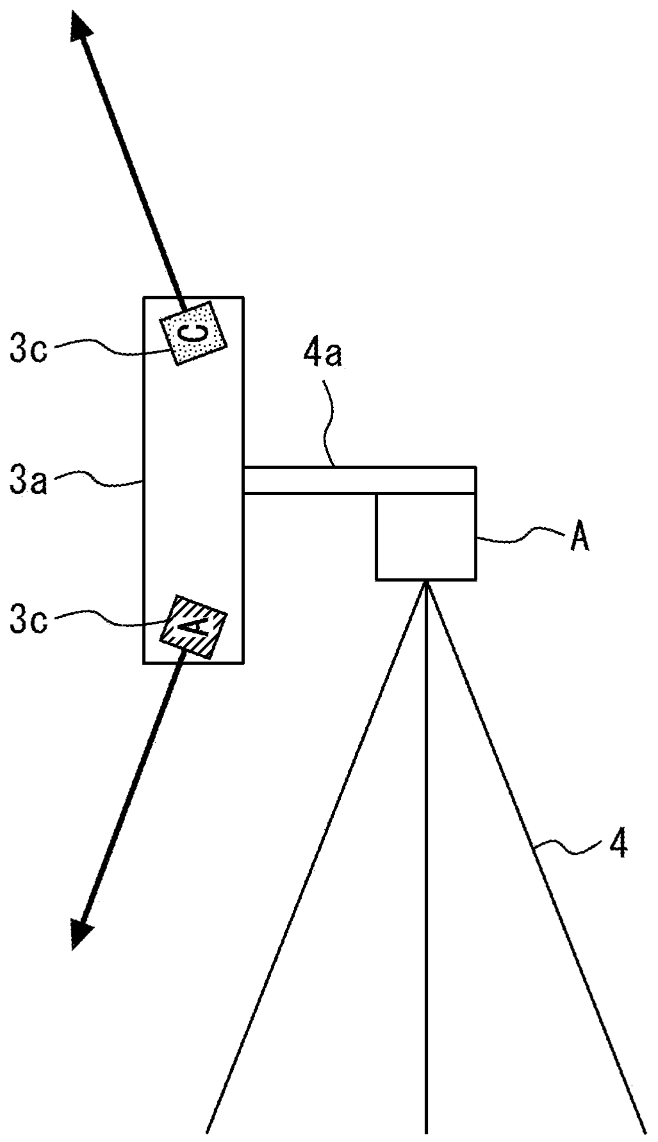
FIG. 24 is a side view of the second modification of the 3D data acquisition system for an elevator according to the first embodiment.

FIGS. 21 and 22 are side views of a 3D data acquisition device used in the second modification of the 3D data acquisition system for an elevator according to the first embodiment. FIGS. 23 and 24 are side views of the second modification of the 3D data acquisition system for an elevator according to the first embodiment.

As shown in FIG. 21, in the 3D data acquisition device 3, the plurality of 3D distance imaging sensors 3*c* are provided in the first housing 3*a* with an elevation angle with respect to a horizontal plane. The plurality of 3D distance imaging sensors 3*c* are provided on the first housing 3*a* so that an opposite direction to the direction of the center of the first housing 3*a* becomes a measurement direction.

As shown in FIG. 22, each of the plurality of light-emitting devices 3*d* is provided on each of a plurality of edges of the second housing 3*b* at a position that is outside of a measurement range of each of the 3D distance imaging sensors 3*c*. The plurality of light-emitting devices 3*d* emit light toward the measurement range of each of the plurality of 3D distance imaging sensors 3*c*. The plurality of light-emitting devices 3*d* emit light so that obstacles do not enter an irradiation range.

For example, as shown in FIG. 23, the supporting body 4 supports the 3D data acquisition device 3 in a laterally facing state from below.

For example, as shown in FIG. 24, the supporting section 4*a* of the supporting body 4 is provided so as to protrude in a horizontal direction from the upper surface of the rotating body A. The supporting section 4*a* supports the 3D data acquisition device 3 in a laterally facing state in a state where the supporting section 4*a* is mounted to an opposite side to the plurality of 3D distance imaging sensors 3*c* in the first housing 3*a*.

INDUSTRIAL APPLICABILITY

As described above, the 3D data acquisition device, the 3D data acquisition system, and the 3D data acquisition method for an elevator according to the present disclosure can be used in elevator systems.

REFERENCE SIGNS LIST

1 Shaft, 2 Car, 3 3D data acquisition device, 3*a* First housing, 3*b* Second housing, 3*c* 3D distance imaging sensor, 3*d* Light emitting device, 4 Supporting body, 4*a* Supporting section, 5 Magnet, 6 Holding body, 7 Terminal, 8 Hydraulic plunger, 9 Hatch door, 10 Car-side guide rail, 11 Bracket, 12 Landing sill, 100*a* Processor, 100*b* Memory, 200 Hardware

The invention claimed is:

1. A 3D data acquisition system for an elevator, comprising:

a 3D data acquisition device including a housing that constitutes an outer shell, and a plurality of 3D distance imaging sensors which are provided in the housing so as to directly face each of a plurality of side walls of a shaft of the elevator on a horizontal projection plane and which acquire 3D point group data;

a support to support the 3D data acquisition device in an upward facing state and a laterally facing state, the upward facing state being a state where a measurement direction of the plurality of 3D distance imaging sensors directly faces each of the plurality of side walls of the shaft of the elevator on the horizontal projection plane, and the laterally facing state being a state where a measurement direction of one of the plurality of 3D distance imaging sensors directly faces a floor surface of the shaft on a vertical projection plane;

a terminal which receives 3D point group data from the 3D data acquisition device; and a holder which is mounted to the support when the support supports the housing in the upward facing state, which is mounted to an opposite side to a side of the plurality of 3D distance imaging sensors in the housing when the support supports the housing in the laterally facing state, and which holds the terminal.

2. The 3D data acquisition system for the elevator according to claim 1, wherein the support rotatably supports the 3D data acquisition device with a rotation axis as a vertical direction.

3. The 3D data acquisition system for the elevator according to claim 1, comprising a magnet which is provided on the support and which generates a magnetic force.

4. A 3D data acquisition system for an elevator, comprising:

a 3D data acquisition device including a housing that constitutes an outer shell, and a plurality of 3D distance imaging sensors which are provided in the housing so as to directly face each of a plurality of side walls of a shaft of the elevator on a horizontal projection plane and which acquire 3D point group data; and a support to support the 3D data acquisition device in an upward facing state and a laterally facing state, the upward facing state being a state where a measurement direction of the plurality of 3D distance imaging sensors directly faces each of the plurality of side walls of the shaft of the elevator on the horizontal projection plane, and the laterally facing state being a state where a measurement direction of one of the plurality of 3D distance imaging sensors directly faces a floor surface of the shaft on a vertical projection plane; and a terminal which receives 3D point group data from the 3D data acquisition device, wherein the terminal announces information prompting raising or lowering a car of the elevator in accordance with a start of acquisition of 3D point group data by the 3D data acquisition device.

5. A 3D data acquisition method for an elevator, comprising:

installing the housing of the 3D data acquisition system according to claim 4 in the upward facing state on a ceiling of the car; and raising or lowering the car after the installing the housing in the upward facing state when the terminal announces information prompting raising or lowering the car.

6. The 3D data acquisition method for the elevator according to claim 5, comprising:

installing the housing in the laterally facing state in a bottom portion of the shaft; and causing the plurality of 3D distance imaging sensors to acquire 3D point group data while rotating the housing with a vertical direction as a rotation axis after the installing the housing in the laterally facing state.

7. A 3D data acquisition device for an elevator, comprising:

a housing that constitutes an outer shell;

a plurality of 3D distance imaging sensors which are provided in the housing so as to directly face each of a plurality of side walls of a shaft of the elevator on a horizontal projection plane and which acquire 3D point group data; and a plurality of light-emitters, each of which is provided on the plurality of edges of the housing at a position outside of a measurement range of each of the plurality of 3D distance imaging sensors and which emit light toward the measurement range of each of the plurality of 3D distance imaging sensors so that obstacles do not enter an irradiation range.

* * * * *